V. J. KOEHLER.
COCK CONTROLLER FOR AIR BRAKE SYSTEMS, &c.
APPLICATION FILED JAN. 8, 1908.
907,248. Patented Dec. 22, 1908.
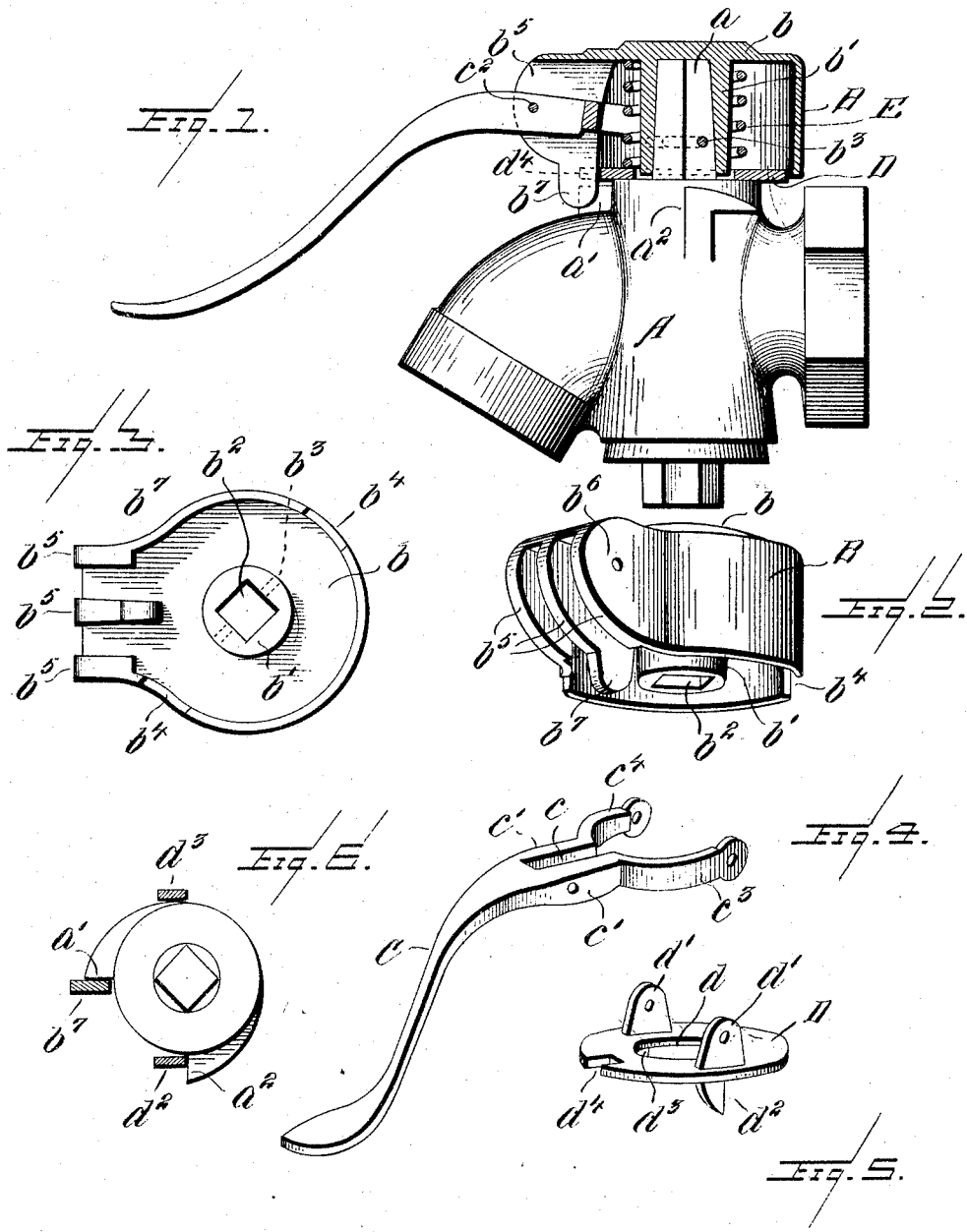

UNITED STATES PATENT OFFICE.

VICTOR J. KOEHLER, OF PUNXSUTAWNEY, PENNSYLVANIA.

COCK-CONTROLLER FOR AIR-BRAKE SYSTEMS, &c.

No. 907,248.	Specification of Letters Patent.	Patented Dec. 22, 1908.

Application filed January 8, 1908. Serial No. 409,833.

*To all whom it may concern:*

Be it known that I, VICTOR J. KOEHLER, citizen of the United States, residing at Punxsutawney, in the county of Jefferson and State of Pennsylvania, have invented certain new and useful Improvements in Cock-Controllers for Air-Brake Systems, &c.; and I do hereby declare the following to be a full, clear, and exact description of the invention, such as will enable others skilled in the art to which it appertains to make and use the same.

My invention relates to certain new and useful improvements in handles for stop cock valves, and is more particularly designed for application to the type of angle cock valves used in air brake systems.

The particular object of my invention is the production of a combined handle and lock, provided with a casing for the protection of the valve stem and its connections against injury by weather conditions and accidental displacement and to produce a positive locking means in either an open or closed position of the valve.

In my device two direct movements of the handle are required to effect the rotary movement of the locking plate and valve stem. This arrangement provides against accidental movement of the valve, by which accidents have frequently happened, owing to the accidental stoppage of communication by reason of the train pipes being closed at some point between the engineer's brake valve and rear end of the train, which may be caused by some object coming in contact with the angle cock plug or stem whereby the spring tension in the angle cock body is relaxed, causing the accidental rotary movement of the angle cock plug or stem to a closed position and preventing the engineer from controlling the brakes in the rear of the closed angle cock.

A further feature of my invention is that no change is required in the angle cock body now in use, when it is desired to use my invention in connection therewith, further than the removal of the present handle and the substitution of my locking device in its place, the said device being secured to the stem of the angle cock by a pin in the usual way.

In order that my invention may be clearly understood, I have illustrated it in the accompanying drawing which shows one form in which I have contemplated embodying my invention and said invention is fully disclosed in the following description and claims.

Referring to the accompanying drawings, Figure 1 is a side elevation partly in section showing an angle cock designed particularly for use with an air brake system, and having my improved controller applied thereto. Fig. 2 is a perspective view of the casing forming part of the controller, and fitted upon the stem of the cock. Fig. 3 is a bottom plan view of said casing. Fig. 4 is a perspective view of the controller lever or handle. Fig. 5 is a similar view of the locking plate. Fig. 6 is a diagrammatic view of the top of the angle cock body showing the positions of the locking lugs.

In the drawings A designates an angle cock of usual or preferred construction adapted especially for use in air brake systems, although I wish it understood that my invention is also applicable to other uses. The angle cock has its body provided at the top with locking shoulders $a'$, $a^2$, and the valve proper of said angle cock is provided with a valve stem $a$ for rotating the valve to open and close the same, which stem is preferably square in cross section as shown.

B represents a cylindrical casing forming part of my improved controller, having a closed top, $b$, from the center of which projects a hollow boss $b'$, having its exterior cylindrical end provided with a recess $b^2$ square in cross section and shaped to fit snugly over the squared valve stem $a$ to which it is secured by a pin $b^3$ passing through the boss and stem as shown. The casing B is provided on opposite sides with recesses $b^4$ in line with the pin $b^3$ to facilitate the insertion and removal of the pin. The casing B is also provided with a plurality of separated ears $b^5$, $b^5$, $b^5$, three being shown perforated at $b^6$ to receive a pivot pin to which the controller lever or handle is secured, and the casing is also provided with a main stop lug $b^7$ depending therefrom, (in this instance formed integrally with the central ear $b^5$) for engaging one or other of the shoulders $a'$, $a^2$ on the body of the cock A, to limit the rotary movement of the valve.

C represents the controller lever or handle which is provided with a portion adapted to be pivotally connected to the casing, and which is slotted at $c$ so as to form bifurcated portions $c'$ $c'$ which straddle the central ear $b^5$ of the casing and lie between the central ear and the outer ears, a pin $c^2$ passing through said ears and the lever and connecting the lever pivotally to the casing. The lever C is also provided with bifurcated outwardly curved arms $c^3$ $c^4$ forming continuations of the parts $c'$ $c'$, the outer ends of which arms are provided with apertures as shown, said arms being so formed that they will lie within the casing B and extend partly around the central boss $b'$ thereof.

D is a locking plate or ring having a central aperture $d$ to allow the plate to surround the boss $b'$ of the casing B and to move vertically with respect thereto. The locking ring or plate D is provided on its upper face with ears $d'$ $d'$ pivotally connected to the ends of the bifurcated arms $c^3$ $c^4$ of the controller lever or handle, and on its lower face with depending locking lugs $d^2$ $d^3$, to engage the locking shoulders $a'$, $a^2$ of the angle cock. The plate D is also provided with a recess or slot $d^4$ to accommodate the locking lug $b^7$ on the casing, as clearly shown in Figs. 1 and 5.

E represents a spring for holding the vertically movable locking plate normally in lowest position, said spring surrounding the boss $b'$ and having its ends bearing against the plate D and the under side of the top of the casing.

The operation of the device will be clearly seen from the drawings. Fig. 1 represents one position of the cock and controller, and Fig. 6 is a diagrammatic view representing it in the same position shown in Fig. 1. In this position the stop lug $b^7$ on the casing is in engagement with the shoulder $a'$ of the cock, and the vertically movable stop lug $d^2$ is in engagement with the shoulder $a^2$, thus locking the valve of the cock firmly in position. When it is desired to change the position of the angle cock valve, the outer end of the lever C is depressed, thus raising the locking plate D against the pressure of the spring E until the locking lug $d^2$ is clear of the shoulder $a^2$ (see Fig. 6) when the lever can be moved laterally to rotate the valve stem, until the stop lug $b^7$ engages the shoulder $a^2$, when the vertically movable locking lug $d^3$ will be in position to engage the shoulder $a'$, and as soon as the lever C is released the spring E will depress the locking plate, and bring the lug $d^3$ into operative relation to the shoulder $a'$ and prevent the return movement of the lever. It will thus be seen that the valve of the angle cock will be held locked in either open or closed position by the engagement of the casing lug $b^7$ with one of the shoulders $a'$ or $a^2$, and the engagement of one of the vertically movable locking lugs $d^2$ or $d^3$, with the other of said shoulders $a'$ or $a^2$.

What I claim and desire to secure by Letters Patent is:—

1. In a cock controlling device, the combination with a part adapted to be rigidly secured to the valve stem, of a vertically movable handle pivotally connected to said part and movable laterally therewith for actuating the valve, a vertically movable annular locking member provided with stop engaging projections and connections between said vertically movable member and said handle whereby the former will be raised by depressing the latter, substantially as described.

2. In a cock controlling device, the combination with a part adapted to be rigidly secured to a valve stem, of a vertically movable handle pivotally connected thereto, a vertically movable annular locking member provided with stop engaging projections, means whereby the operation of said handle will raise said vertically movable member and a spring for normally retaining said vertically movable member in a lowered position, substantially as described.

3. In a cock controlling device, the combination with a part adapted to be rigidly secured to a valve stem, of a vertically movable handle pivotally connected to said part and movable laterally therewith for actuating the valve, a vertically movable annular locking member provided with stop engaging projections, connections between said vertically movable member and said handle whereby the former will be raised by depressing the latter and means for normally retaining said vertically movable member in a lowered position, substantially as described.

4. In a cock controlling device, the combination with a part adapted to be rigidly secured to a valve stem, a casing inclosing the valve stem, locking member, a portion of the handle and the connections between it and the locking member, a vertically movable locking member provided with stops for engaging the valve casing, a vertically movable handle pivoted intermediate of its ends to said casing and having one end connected with said vertically movable locking member whereby the operation of said handle will adjust said movable locking member to its normal position, and means whereby a portion of the handle will be held normally in lowest position, substantially as described.

5. In a cock controlling device, the combination with a casing having a portion adapted to be rigidly secured to a valve stem, of a vertically movable annular locking member within said casing, a vertically movable handle pivoted intermediate of its ends to said casing and having one end connected with said vertically movable locking member whereby downward movement of the free end of said handle will raise said vertically movable locking member, and a spring within said casing bearing on said locking member and normally retaining the same in locking position, substantially as described.

6. In a cock controlling device, the combination with a casing, of a central hollow boss within said casing and provided with a portion for engaging a valve stem, a locking ring surrounding said central boss and vertically movable thereon, said ring being provided on its under side with locking lugs, a vertically movable handle pivoted intermediate of its ends to said casing and having one end pivoted to said ring whereby downward movement of the free end of said handle will raise said ring and a coiled spring around said center boss bearing at its ends against said ring and said casing, and a stopping lug movable laterally with said casing engaging a portion of the movable locking member, and thereby to prevent the rotary movement of the valve stem or cock valve when the locking member is in its adjusted lowered position, substantially as described.

7. In a cock controlling device, the combination with a casing, and means for securing it to the valve stem, said casing having a stop lug for engaging portions of the cock to limit the movement of the valve thereof, a handle pivotally connected to said casing and movable laterally therewith to actuate the valve of the cock, a movable locking plate provided with locking projections for locking the cock valve in the positions in which it is stopped by the said stop lug, and connections between said locking plate and said handle for releasing said lock plate when the handle is moved upon its pivotal connection with the casing, substantially as described.

8. In a cock controlling device, the combination with a casing, having a hollow central boss adapted to fit over the valve stem, means for connecting the boss and stem, the casing having an exterior wall surrounding the boss and provided with apertures to facilitate the insertion and removal of said connecting means, a movable locking plate within the casing and surrounding the boss, a handle pivotally mounted on the casing movable laterally therewith to actuate the valve and having portions pivotally connected to the locking plate, said locking plate being provided with locking projections to engage projecting stops on the valve casing to lock the valve in open and closed position, substantially as described.

9. In a cock controlling device, the combination with a part adapted to be rigidly secured to a valve stem, a rotary movable locking member provided with stops for engaging the valve body, a valve casing, a handle pivotally mounted thereon, connections between the locking member and handle whereby the operation of the handle will adjust said movable locking member to one operative position, the casing having a boss and an exterior wall surrounding the boss to protect the valve stem, locking member, a portion of the handle, and its connections, said exterior wall being provided with apertures or recesses to facilitate the insertion and removal of the connecting means, substantially as described.

In testimony whereof I affix my signature, in the presence of two witnesses.

VICTOR J. KOEHLER.

Witnesses:
 WILLIAM POGUE NORTH,
 JAMES CARLETON MINER.